(12) United States Patent
Koyama

(10) Patent No.: US 8,171,961 B2
(45) Date of Patent: May 8, 2012

(54) PLUG STRUCTURE

(75) Inventor: Fumitoshi Koyama, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 42 days.

(21) Appl. No.: 12/794,197

(22) Filed: Jun. 4, 2010

(65) Prior Publication Data

US 2010/0319800 A1    Dec. 23, 2010

(30) Foreign Application Priority Data

Jun. 23, 2009    (JP) .................. 2009-148715

(51) Int. Cl.
*F16L 55/11* (2006.01)
(52) U.S. Cl. .................. 138/89; 138/90; 29/522.1
(58) Field of Classification Search .......... 138/89, 138/90; 165/168; 251/206, 207
See application file for complete search history.

(56) References Cited

U.S. PATENT DOCUMENTS

| | | | | |
|---|---|---|---|---|
| 1,686,562 A | * | 10/1928 | Jackson | 228/137 |
| 1,928,443 A | * | 9/1933 | Archer et al. | 165/168 |
| RE19,309 E | * | 9/1934 | Archer et al. | 165/168 |
| 2,138,404 A | * | 11/1938 | Haas | 29/509 |
| 3,825,146 A | * | 7/1974 | Hirmann | 220/234 |
| 5,848,616 A | * | 12/1998 | Vogel et al. | 138/89 |
| 7,588,052 B2 | * | 9/2009 | Reuter | 138/89 |

FOREIGN PATENT DOCUMENTS

| | | |
|---|---|---|
| JP | 9-209941 A | 8/1997 |
| JP | 11-280982 A | 10/1999 |

* cited by examiner

*Primary Examiner* — Patrick F Brinson
(74) *Attorney, Agent, or Firm* — Buchanan Ingersoll & Rooney PC

(57) ABSTRACT

A plug structure for sealing an opening end portion of a circular fluid passage formed in a housing comprises a plug being equal in resistance against deformation to, or smaller than, the housing and having an annular flange portion formed on an end portion of a circular column portion; a flange pressure-contacting portion of the opening end portion deformed to be pressure-contacted with a lower surface of the annular flange portion by being caulked with a caulking tool; a contracted diameter portion of a shape gradually narrow in the middle to which the circular column portion is deformed as a result that the fluid passage is deformed by the caulking to be contracted in diameter; and a deformed circumferential portion to which the circumferential edge of the annular flange portion of the plug is deformed by the caulking to be pressure-contacted with the flange pressure-contacting portion of the opening end portion.

7 Claims, 6 Drawing Sheets

PLUG STRUCTURE

This application is based on and claims priority under 35 U.S.C. 119 with respect to Japanese Application No. 2009-148715 filed on Jun. 23, 2009, the entire content of which is incorporated herein by reference.

BACKGROUND OF THE INVENTION

1. Field of the Invention

The present invention relates to a plug structure for sealing a hole which is formed on a housing or the like of a fluid device sealed with fluid therein.

2. Discussion of the Related Art

For example, fluid devices used in the field of this related art include a brake system with a hydraulic circuit for a motor car and the like and also include a plunger pump used as a hydraulic pressure source for an accessory system such as antiskid system, power steering system or the like. In a plunger pump described in JP9-209941 A, there is shown a structure that a sealing plug is press-fitted in a port formed on a housing and that the circumferential edge of an opening end portion of the port is caulked to prevent the sealing plug from coming off due to the pressure acting in a fluid passage as well as to fluid-tightly seal the port.

Further, JP11-280982 A shows another structure that a steel ball is press-fitted in a port formed on an aluminum housing and that the circumferential edge of an opening end portion of the port is caulked to prevent the steel ball from coming off due to the pressure acting in the port as well as to fluid-tightly seal the port.

As a method of forming a sealing structure by press-fitting a steel ball in a port and by caulking the circumferential edge of an opening end portion of the port in the manner described above, the following technology has heretofore been known for example. First of all, as shown in FIG. 7, a steel ball 80 is press-fitted by a first punching member 82 from the outside in an end portion of a port 85 of a housing 84 to be pushed against a stop holding portion 86 at an inner side. Then, as shown in FIG. 8, the circumferential edge 90 of the opening end portion is struck by a second punching member 88 from the outside to caulk the circumferential edge 90 of the opening end portion. Further, as shown in FIG. 9, the circumferential edge 90 of the opening end portion is repetitively struck by the second punching member 88 to make the opening end portion narrow. Finally, as shown in FIG. 10, the striking is further repeated to bring the circumferential edge 90 of the opening end portion into contact with the outside end of the steel ball 80. As shown in FIG. 11, this results in covering the outside of the steel ball 80 mainly through the plastic deformation of the circumferential edge 90 of the opening end portion to hold the steel ball 80 at the plastically deformed circumferential edge 90 of the opening end portion as well as at the stop holding portion 86. In use, a hydraulic pressure acts on the steel ball 80 in the direction indicated by the arrow shown at a lower part of the figure.

However, in the sealing structures described in the aforementioned Japanese applications, only the circumferential edge of the opening end portion deformed by caulking serves to bear a high pressure exerted on the sealing plug or the steel ball. Thus, it is difficult to secure the strength of the circumferential edge which is deformed by caulking at the opening end portion of the port for preventing the sealing plug or the steel ball from coming off the port, and therefore, a problem may arise in that it is insufficient to prevent the sealing plug or the steel ball from coming off due to the high hydraulic pressure acting in the fluid passage. In addition, in the steps of forming the sealing structure, the caulking has to be done by using two kinds of punching members including the first and second punching members, and thus, there arise another problem that an increase in the manufacturing steps causes the manufacturing cost to rise.

SUMMARY OF THE INVENTION

Accordingly, it is a primary object of the present invention to provide an improved sealing or plug structure for a fluid device capable of sealing, in a high quality of fluid tightness, a port formed on a fluid device to be sealed with fluid therein, so that a sealing member can reliably be prevented from coming off even if a high pressure is loaded thereon.

Briefly, according to the present invention, there is provided an improved plug structure for sealing an opening end portion of a fluid passage being circular in cross-section and formed in a housing. The plug structure comprises a plug being equal in resistance against deformation to, or smaller than the housing, and having a circular column portion and an annular flange portion formed on an end portion of the circular column portion; a flange pressure-contacting portion of the opening end portion deformed to be pressure-contacted with a lower surface of the annular flange portion of the plug, wherein a part around the annular flange portion of the opening end portion is deformed with the plug fitted at the circular column portion in the fluid passage and engaged at the annular flange portion with the opening end portion; a contracted diameter portion of a shape made to be gradually narrow in the middle to which the circular column portion of the plug is deformed by the fluid passage which is contracted in diameter with the deformation of the part around the annular flange portion of the opening end portion; and a deformed circumferential portion at a circumferential edge of the annular flange portion of the plug, the deformed circumferential portion being deformed to be pressure-contacted with the flange pressure-contacting portion of the opening end portion.

With this construction, at the opening end portion of the fluid passage, the part around the annular flange portion of the opening end portion is deformed to be swelled toward the annular flange portion, whereby the flange pressure-contacting portion brought into pressure contact with the lower surface of the annular flange portion is formed at the opening end portion. The circumferential edge of the annular flange portion is crushed and pressure-contacted with the flange pressure-contacting portion to form the deformed circumferential portion at the circumferential edge of the annular flange portion of the plug. Further, the circular column portion of the plug is deformed by the fluid passage which is contracted in diameter with the deformation of the part around the annular flange portion of the opening end portion, to form the contracted diameter portion of the shape made to be gradually narrow in the middle. The plug structure is provided with the flange pressure-contacting portion, the deformed circumferential portion and the contracted diameter portion and thus, constitutes a structure capable of preventing the plug from coming off the opening end portion of the fluid passage. Further, the plug and the opening end portion of the housing are plastically deformed with one on the other to realize an undividable one-piece structure in which they are adhered to each other over a wide area. Therefore, it is possible to seal the fluid passage with the fluid-tightness enhanced, and thus, the coming-off of the plug can be prevented reliably even when a high hydraulic pressure acts on the plug.

Preferably, in another aspect of the present invention, the flange pressure-contacting portion of the housing and the contracted diameter portion of the plug are formed by providing an annular depression having a wedge shape in section on the opening end portion of the housing. That is, by providing the annular depression on the opening end portion, the part around the annular flange portion of the opening end portion is deformed to form the flange pressure-contacting portion on the opening end portion of the housing, and the deformation of the part around the annular flange portion of the opening end portion causes the fluid passage to be contracted in diameter and in turn causes the circular column portion of the plug to be deformed to the shape made to be narrow in the middle, so that the circular column portion is deformed to the contracted diameter portion.

Further preferably, in a further aspect of the present invention, together with the flange pressure-contacting portion of the housing and the contracted diameter portion of the plug, the deformed circumferential portion on the annular flange portion of the plug is formed with a caulking tool which has a concave contact surface for crushing the circumferential edge of the annular flange portion and an annular peak portion formed on the circular edge of the concave contact surface for forming the annular depression on the opening end portion. Since the flange pressure-contacting portion of the housing, the contracted diameter portion of the plug and the deformed circumferential portion on the annular flange portion of the plug are formed through a single striking stroke of the caulking tool, the cost for manufacturing the plug structure can be reduced, and the manufacturing efficiency can be enhanced.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
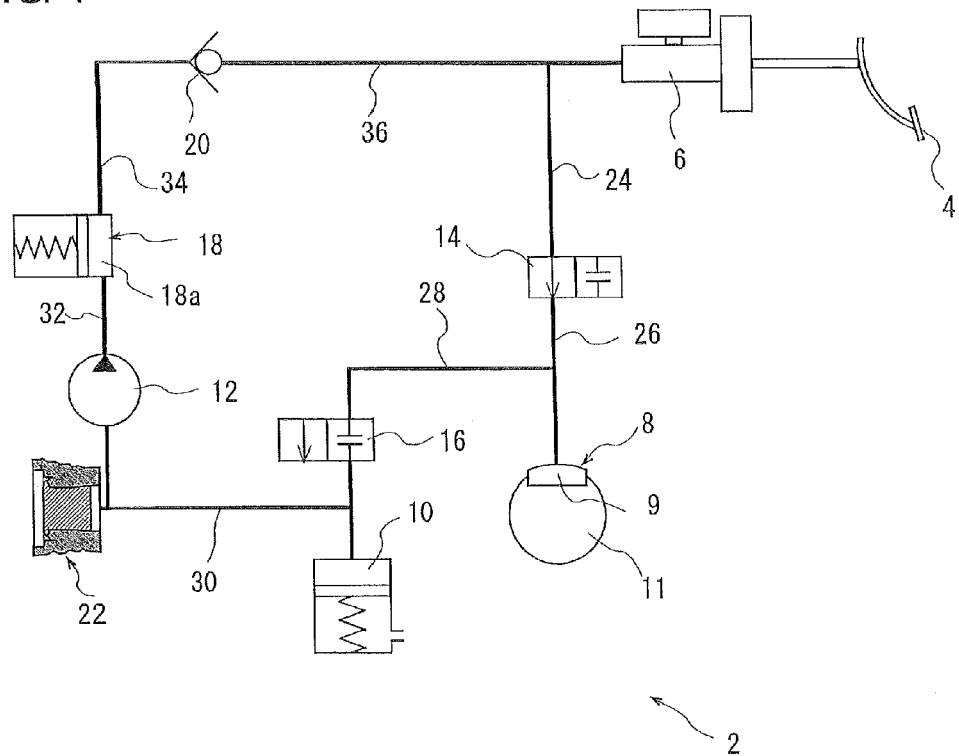
FIG. 1 is a diagram showing a hydraulic circuit for a vehicle brake device incorporating a plug structure in an embodiment according to the present invention.

Hereafter, with reference to FIGS. 1 through 6, description will be made regarding an embodiment in which a plug device using a plug structure according to the present invention is implemented in a hydraulic circuit for a vehicle brake device. As shown in FIG. 1, the hydraulic circuit 2 for the vehicle brake device comprises a brake pedal 4, a master cylinder 6 and a brake cylinder 8 (one only shown typically for one of four road wheels of the vehicle). The hydraulic circuit further comprises an accumulation reservoir 10, a motor-driven pump 12 (which are usually common to two brake cylinders for two road wheels) and electromagnetic valves 14, 16 for the brake cylinder 8, all of which constitutes an antilock mechanism (i.e., ABS: antilock braking system) for the vehicle. Between the lower stream side of the pump 12 and the master cylinder 6, there are provided a pulse pressure damping means 18 (e.g., accumulator) and a check valve 20 both for damping the pressure pulsation in the pressurized oil discharged from the pump 12. Further, on the upper stream side of the pump 12, a plug device 22 as blank cap is provided at an opening end portion 42 (refer to FIG. 2) formed on a housing 40.

The master cylinder 6 is connected to the brake cylinder 8 through a first pipe 24, the electromagnetic valve 14 and a second pipe 26. The master cylinder 6 pressurizes working fluid (glycol-base brake fluid) when the brake pedal 4 is stepped in, and discharges the working fluid to the brake cylinder 8. The brake cylinder 8 presses brake pads 9 (one only shown) on a brake disc 11 with the hydraulic pressure to restrict the rotation of a wheel.

The brake cylinder 8 is connected to the reservoir 10 through a third pipe 28. The electromagnetic valve 14 is connected between the first pipe 24 and the second pipe 26, while the electromagnetic valve 16 is connected between the third pipe 28 and the reservoir 10. The electromagnetic valves 14 and 16 are controllable to be opened and closed in response to signals from a controller (not shown) for preventing the wheel from being locked. When the electromagnetic valve 16 is opened with the electromagnetic valve 14 closed, the working fluid is drained from the brake cylinder 8, so that the hydraulic pressure in the brake cylinder 8 is reduced. The working fluid drained from the brake cylinder 8 is accumulated in the reservoir 10. Thus, the force of the brake cylinder 8 for braking the wheel is weakened not to lock the wheel. The reservoir 10 is connected to the pump 12 through a fourth pipe 30.

The pump 12 comprises a plunger pump. The pump 12 draws the working fluid from the reservoir 10, pressurizes the working fluid and discharges the pressurized working fluid toward the pulse pressure damping means 18 side. The pump 12 is provided with a fifth pipe 32 leading to the pulse pressure damping means 18.

The pulse pressure damping means 18 is provided with a buffer chamber 18a into which the working fluid flows, and damps or decrease the fluctuation in pressure of the working fluid by varying the volume of the buffer chamber 18a in dependence on the pressure of the working fluid. The working fluid is fed form the pulse pressure damping means 18 to the master cylinder 6 through a sixth pipe 34, the check valve 20 and a seventh pipe 36.

Figure 6:
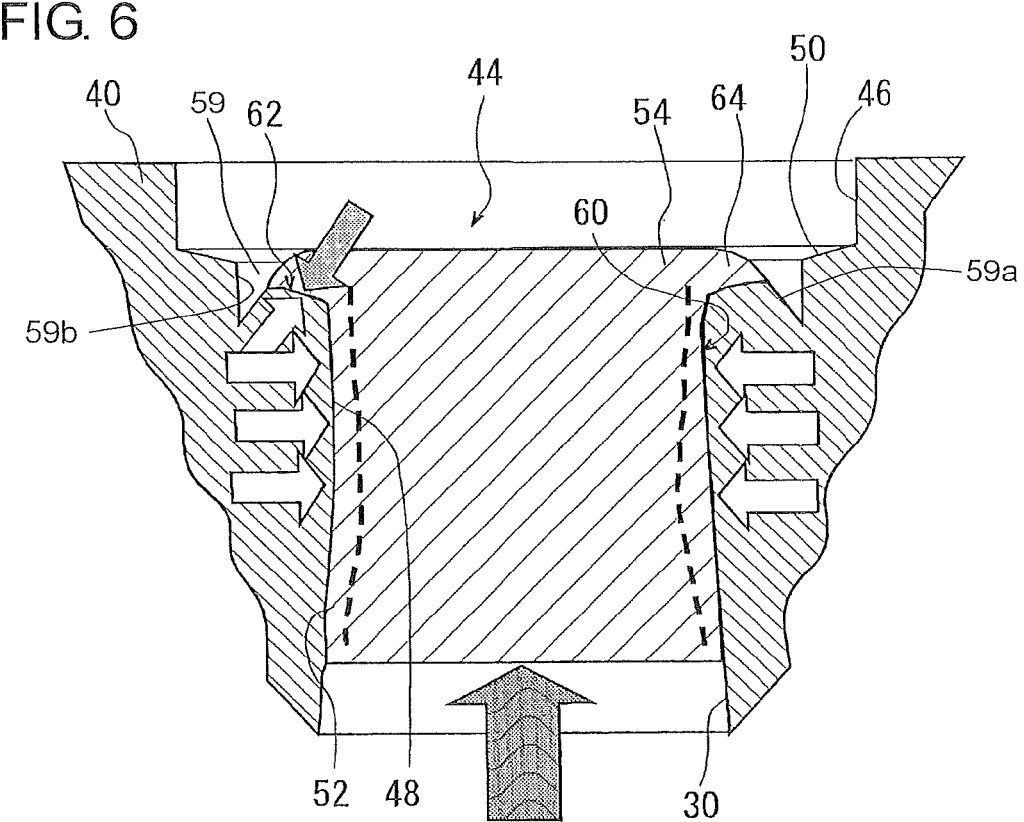
FIG. 6 is an enlarged sectional view of the plug structure, simultaneously showing the state in use of the structure and explaining the transition in deformation in the forming phases.
Figure 7:
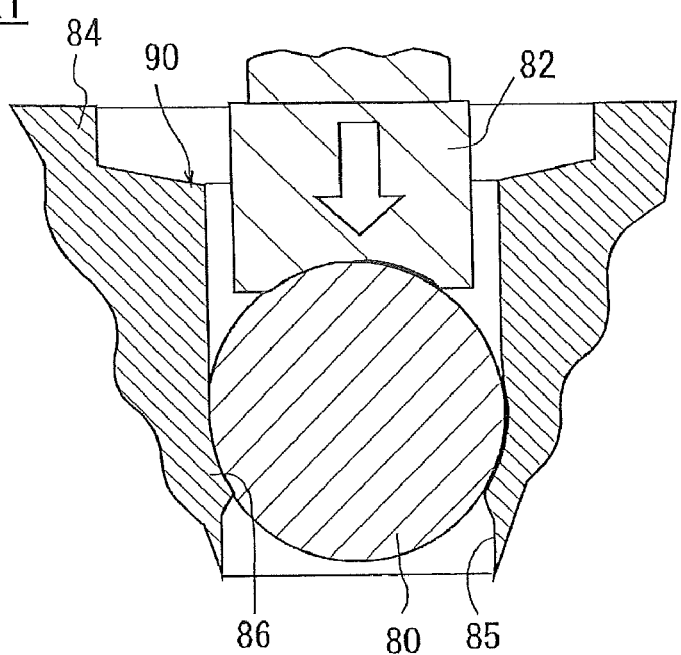
FIG. 7 is a sectional view showing a forming step for a prior art sealing structure.
Figure 8:
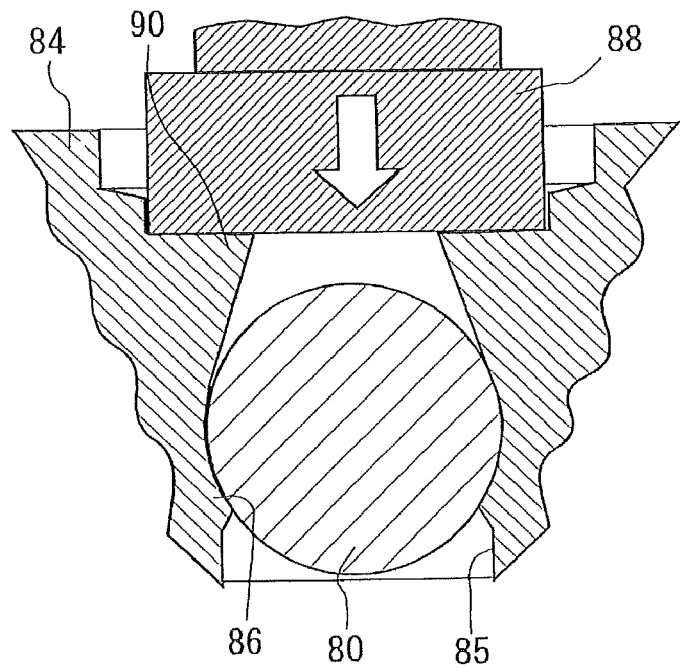
FIG. 8 is a sectional view showing another forming step advanced from the step shown in FIG. 7.
Figure 9:
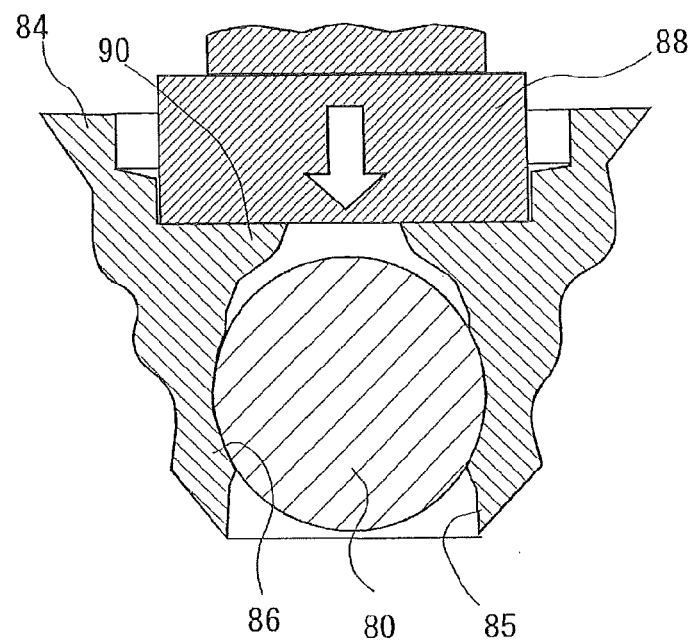
FIG. 9 is a sectional view showing still another forming step further advanced from the step shown in FIG. 8.
Figure 10:
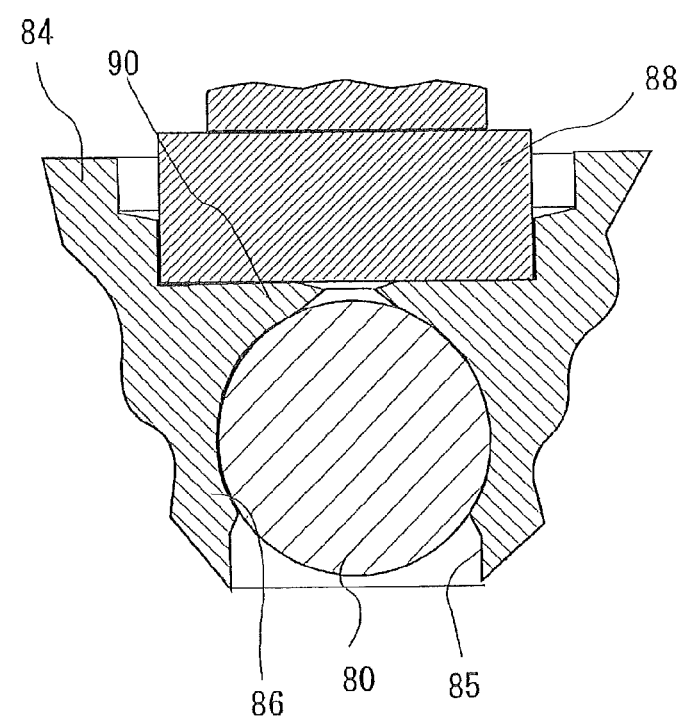
FIG. 10 is a sectional view showing a final forming step further advanced from the step shown in FIG. 9.
Figure 11:
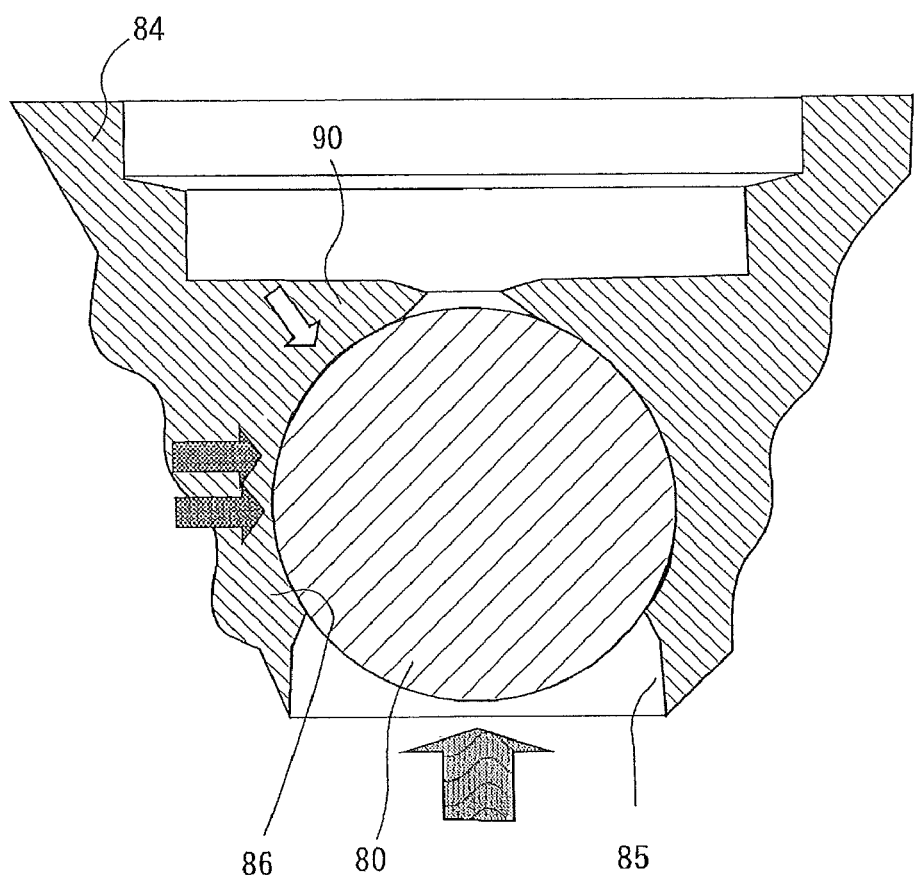
FIG. 11 is an enlarged section view of the prior art sealing structure in the state of use.

A shown in FIG. 6, the plug device 22 comprises a structure formed at an opening end portion 42 of a port provided on the housing 40 and a plug 44 sealing (i.e., fluid-tightly closing) the opening end portion 42. The plug 44 is made of a material which is equal in resistance against deformation to, or smaller than, the housing 40. At the opening end portion 42 of the housing 40, there are formed a large-diameter outer internal wall portion 46, a small-diameter inner internal wall portion (fluid passage) 48 and an annular conical surface 50 formed between the outer internal wall portion 46 and thinner internal wall portion 48. The plug 44 comprises a cylindrical or circular column portion 52 of a diameter snugly fittable in the inner internal wall portion 48 and an annular flange portion 54 which is formed at one end portion of the circular column portion 52 and which is smaller in diameter than the outer internal wall portion 46, but larger in diameter than the inner internal wall portion 48.

Figure 2:
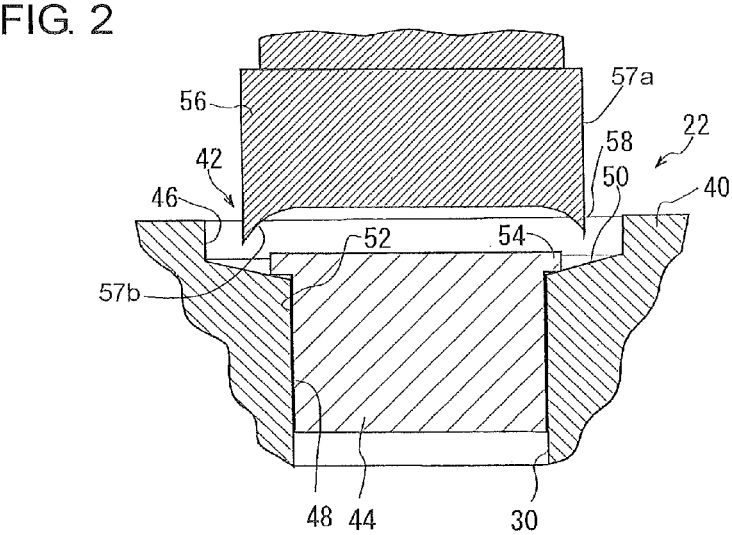
FIG. 2 is a sectional view showing a forming start phase for the plug structure.

The plug device 22 is formed through one caulking step including transient phases shown in FIGS. 2 to 5 as described hereinafter to constitute a sealing structure. First of all, as shown in FIG. 2, the plug 44 is set by being inserted at the circular column portion 52 into the inner internal wall portion 48 and by being brought into contact at an external edge of the annular flange portion 54 with the annular conical surface 50 constituting the opening end portion 42. Then, a caulking is performed using a punching member 56. The punching member 56 has a cylindrical external surface 57a, a generally concave lower end contact surface 57b and an annular peak portion 58 which is formed at a lower circumferential edge of the concave lower end contact surface 57b to protrude downward at an acute angle. The annular peak portion 58 is formed to be a little larger in diameter than the annular flange portion 54 of the plug 44, but to be smaller in diameter than the outer internal wall portion 46. Preferably, the diameter of the annular peak portion 58 is set to be a middle diameter between the diameters of the outer and inner internal wall portions 46, 48.

Figure 3:
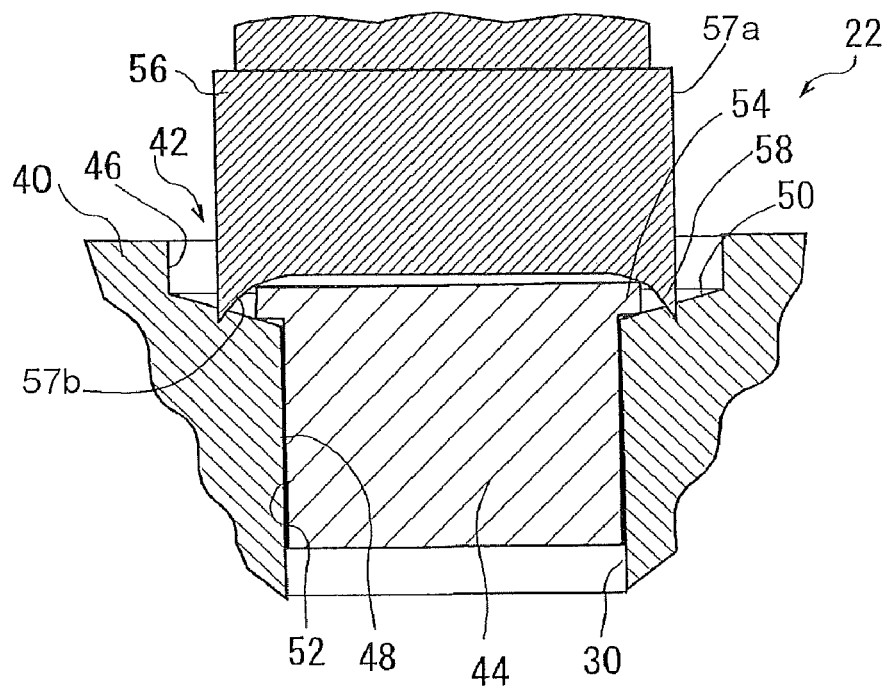
FIG. 3 is a sectional view showing a forming transient phase for the plug structure advanced from the forming start phase shown in FIG. 2.
Figure 4:
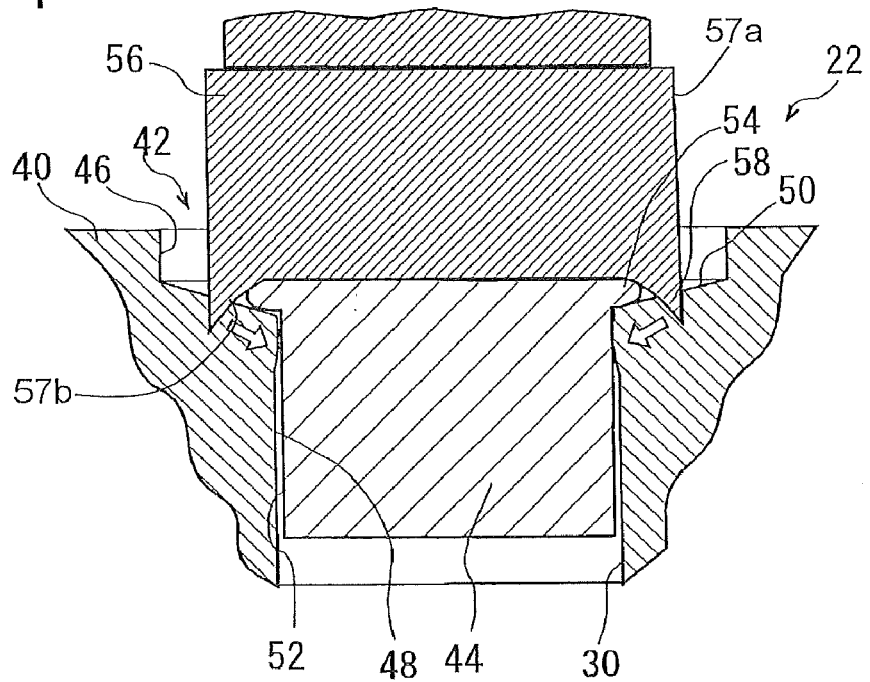
FIG. 4 is a sectional view showing another forming transient phase for the plug structure further advanced form the transient phase shown in FIG. 3.
Figure 5:
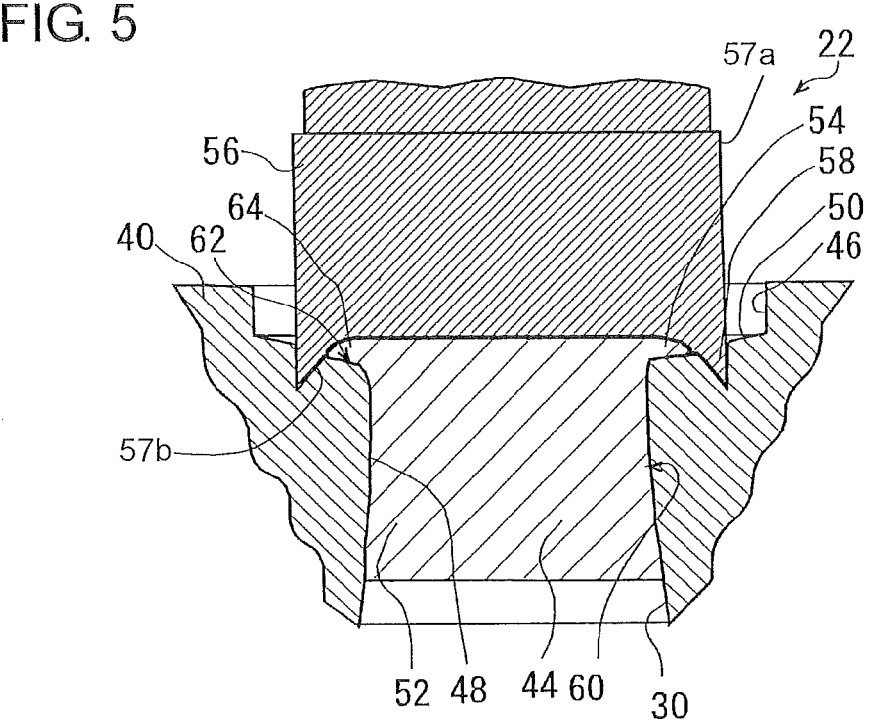
FIG. 5 is a sectional view showing a forming final phase for the plug structure further advanced form the transient phase shown in FIG. 4.

Then, as shown in FIGS. 3 to 5, through one striking with the punching member 56, the external edge portion of the annular flange portion 54 is squeezed or crushed, and the annular peak portion 58 is driven into the annular conical surface 50 to form an annular depression 59 of a wedge shape in longitudinal section on the annular conical surface 50 at around the circumference of the annular flange portion 54. As a result that the annular depression 59 of the wedge shape in longitudinal section is formed in this way, the material pushed aside by the annular peak portion 58 is radially inwardly moved from the annular conical surface 50 toward the inner internal wall portion 48 side, as shown in FIG. 6, whereby the inner internal wall portion 48 forming the fluid passage is deformed and swelled inwardly to be shrunken or contracted in diameter. This diameter-contracting deformation causes the circular column portion 52 of the plug 44 to be pressed at an external surface thereof, whereby the circular column portion 52 of the plug 44 is deformed to form a tabor or hourglass-shape contracted diameter portion 60 which is made to be gradually narrowed at its axial mid portion. Further, as a result of forming the annular depression 59 of the wedge shape in longitudinal section on the annular conical surface 50, the part of the annular conical surface 50 residing inside the annular peak portion 58 is swelled out toward a lower surface of the annular flange portion 54 of the plug 44. At this time, the external edge portion of the annular flange portion 54 is squeezed or crushed by the concave lower end contact surface 57b of the punching member 56 toward the annular conical surface 50 side to form a deformed circumferential edge portion 64 whose circumferential surface extends to align with an inside slant surface 59a of the wedge-shape annular depression 59. The wedge-shape annular depression 59 is formed to extend an outside surface 59b thereof in parallel to the axis of the plug 44, so that the material pushed aside by the annular peak portion 58 and the concave lower end surface 57b of the punching member 56 is moved mainly inward in radial direction and outward in axial direction.

As a consequence, the part of the annular conical surface 50 residing inside the annular peak portion 58 and the lower surface of the annular flange portion 54 mutually come close to be brought into the state that they are adhered closely, and a flange pressure-contacting portion 62 is formed at the part of the annular conical surface 50 residing inside the annular peak portion 58. Because not only the opening end portion 42 of the port but also the plug 44 is plastically deformed at the same time, the circular column portion 52 having been deformed to take a tabor or hourglass shape is pressure-contacted as a whole against the internal surface of the inner internal wall portion 48, and the annular flange portion 54 and the flange pressure-contacting portion 62 are pressure-contacted against each other. Therefore, there is constituted a sealing structure wherein the opening end portion 42 of the port and the plug 44 are adhered closely to become an undividable one-piece body. In this way, the inner internal wall portion 48 and the plug 44 are united as one body to have a reliable fluid-tightness, and therefore, even if a high pressure is loaded by the working fluid, it does not occur that the plug 44 comes off the housing 40. Moreover, since the caulking can be done with the punching member 56 of one kind at one step including the transient phases shown in FIGS. 2 to 5, it is possible to reduce the manufacturing step and the manufacturing cost.

In the plug device 22 of the aforementioned construction, the part of the annular conical surface 50 which part is around the circumference of the annular flange portion 54 is depressed by the annular peak portion 58 of the punching-member 56, and hence, the part of the annular conical surface 50 residing inside the annular peak portion 58 is swelled out to be brought into contact with the lower surface of the annular flange portion 54, whereby the flange pressure-contacting portion 62 is formed at the opening end portion 42 of the fluid passage 30 (the fourth pipe). Further, the circumferential edge of the annular flange portion 54 is squeezed or crushed by the inside surface of the annular peak portion 58 (that is, by the concave lower end contact surface 57b of the punching member 56) to be pressure-contacted with the flange pressure-contacting portion 62, whereby the deformed circumferential edge portion 64 is formed.

Further, the contracted diameter portion 60 is formed as follows. First of all, the annular conical surface 50 constituting the opening end portion 42 is depressed by being pressed with the annular peak portion 58, and the material pushed aside due to the annular depression 59 is moved to be deformed toward the inner internal wall portion 48 side of the fluid passage 30. The deformation movement causes the inner internal wall portion 48 of the fluid passage 30 to be swelled radially inward and to be contracted in diameter through deformation. Further, the circular column portion 52 of the plug 44 snugly fitted in the opening end portion 42 yields to the diameter contraction deformation, whereby the contracted diameter portion 60 is formed by being deformed to the tabor or hourglass shape gradually narrow in the middle, in the state that it is pressure-contacted with the deformed inner internal wall portion 48.

The plug device 22 in the present embodiment is provided with the flange pressure-contacting portion 62, the deformed circumferential edge portion 64 and the contracted diameter portion 60 which are formed in the manner as described above, and is able to constitute the structure that the plug 44 does not come off the opening end portion 42 of the fluid passage 30. At the same time, the plug 44 and the opening end portion 42 are struck with one put on the other to be deformed plastically, so that the plug device 22 takes the sealing structure of an undividable one-piece body in which the plug 44 and the opening end portion 42 are adhered closely over a wide area. Therefore, the plug device 22 is able to seal the fluid passage 30 in the state that the fluid tightness is very reliable, and is able to reliably prevent the plug 44 from coming off even when a high pressure acts on the plug 44.

In the foregoing embodiment, the plug device is provided on a part of a piping arrangement. The present invention is not limited to the plug device so arranged and instead, may be applicable to a plug device for sealing an opening portion provided on, e.g., a housing of a plunger pump.

Further, although the glycol-base brake fluid is used as the working fluid circulating through the fluid passages, the present invention is not limited to the use of the glycol-base brake fluid. In other fluid devices than the brake device, there may be used oil or water for example.

Obviously, numerous further modifications and variations of the present invention are possible in light of the above teachings. It is therefore to be understood that within the scope of the appended claims, the present invention may be practiced otherwise than as specifically described herein.

What is claimed is:

1. A plug structure for sealing an opening end portion of a fluid passage being circular in cross-section and formed in a housing, the structure comprising:
   a plug being equal in resistance against deformation to, or smaller than the housing, and having a circular column portion and an annular flange portion formed on an end portion of the circular column portion;
   a flange pressure-contacting portion of the opening end portion deformed to be pressure-contacted with a lower surface of the annular flange portion of the plug, wherein a part around the annular flange portion of the opening end portion is deformed with the plug fitted at the circular column portion in the fluid passage and engaged at the annular flange portion with the opening end portion;
   a contracted diameter portion having a shape made to be gradually narrow in the middle in which the circular column portion of the plug is deformed by the fluid passage which is contracted in diameter with the deformation of the part around the annular flange portion of the opening end portion; and
   a deformed circumferential portion at a circumferential edge of the annular flange portion of the plug, the deformed circumferential portion being deformed to be pressure-contacted with the flange pressure-contacting portion of the opening end portion.

2. The plug structure as set forth in claim 1, wherein the circular column portion of the plug has an outer diameter fittable in the fluid passage while the circumferential edge of the annular flange portion has a larger diameter than an inside diameter at the opening end portion of the fluid passage so that a lower portion of the annular flange portion is closely engaged with a circumferential edge portion of the opening end portion.

3. The plug structure as set forth in claim 1, wherein an annular depression having a wedge shape in section is formed around the opening end portion of the housing so that a part of the housing at an inside of the annular depression is deformed to be brought into pressure contact with a lower surface of the annular flange portion of the plug.

4. The plug structure as set forth in claim 3, wherein the annular depression having the wedge shape in section is formed around the opening end portion of the housing so that the part of the housing at the radially inside of the annular depression is deformed to contract an inside diameter of the fluid passage formed in the housing and an outer diameter of the circular column portion of the plug to a shape gradually narrow in the middle, in addition to bringing the part of the housing at the inside of the annular depression into pressure contact with the lower surface of the annular flange portion of the plug.

5. The plug structure as set forth in claim 4, wherein the deformed circumferential portion at the circumferential edge of the annular flange portion of the plug constitutes a circumferential surface extending to align with an inside slant surface of the wedge-shape annular depression.

6. The plug structure as set forth in claim 5, wherein an outside surface of the wedge-shape annular depression extends in parallel to the axis of the plug.

7. The plug structure as set forth in claim 1, wherein the part of the opening end portion around the annular flange portion is deformed with a caulking tool having a concave contact surface contactable with an end surface of the annular flange portion of the plug and an annular peak portion protruding from a circumferential edge portion of the concave contact surface.

* * * * *